March 25, 1969   F. M. VODOKLYS   3,435,271
DISCHARGE LAMP INCORPORATING PHOSPHOR WHICH IS NORMALLY
SENSITIVE TO LEHRING AND METHOD
Filed Aug. 12, 1966
FIG.1.
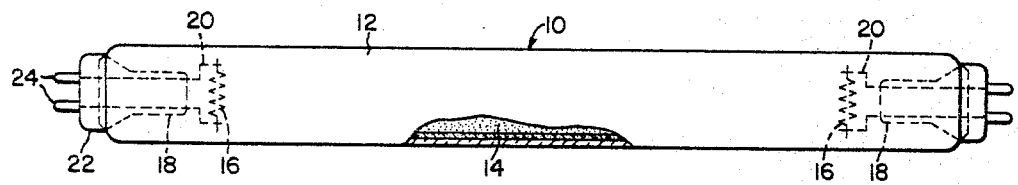
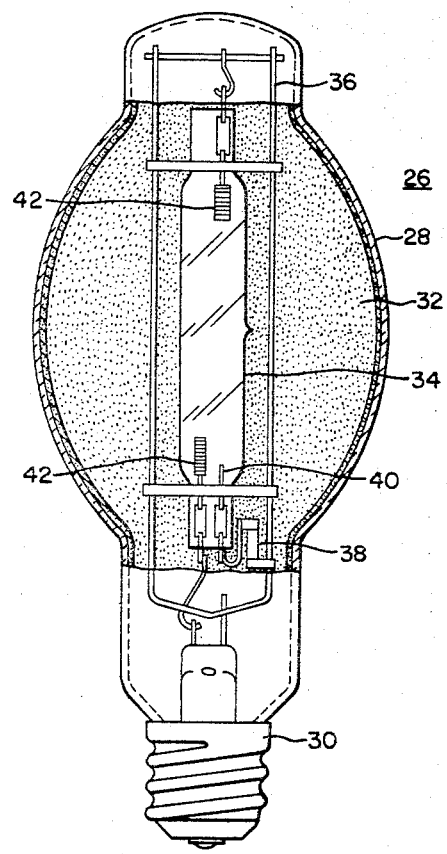
FIG.2.
WITNESSES
Theodore F. Wrobel
James F. Young
INVENTOR
Frank M. Vodoklys
BY
W. D. Palmer
ATTORNEY

United States Patent Office 3,435,271
Patented Mar. 25, 1969

3,435,271
DISCHARGE LAMP INCORPORATING PHOSPHOR WHICH IS NORMALLY SENSITIVE TO LEHRING AND METHOD
Frank M. Vodoklys, Wayne, N.J., assignor to Westinghouse Electric Corporation, Pittsburgh, Pa., a corporation of Pennsylvania
Filed Aug. 12, 1966, Ser. No. 572,095
Int. Cl. H01j 1/63, 63/04
U.S. Cl. 313—109         11 Claims

ABSTRACT OF THE DISCLOSURE

Discharge device incorporates finely divided phosphor which has been initially prepared by firing in a nonoxidizing atmosphere. There is provided over the phosphor a thin layer of one or more of potassium bromide, strontium bromide, potassium chloride, or sodium chloride in order to improve the performance of the discharge device. The thin layer is applied by dissolving the specified material in a vehicle in which the finely divided phosphor is slurried, and thereafter evaporating the vehicle.

---

This invention generally relates to discharge lamps and, more particularly, to discharge lamps incorporating phosphor which is normally sensitive to lehring, as well as methods for treating these phosphors, in order to improve the performance of the discharge lamp which incorporates the phosphor.

In order to obtain optimum performance for some phosphors, it is necessary to fire the raw-mix constituents in a slightly reducing atmosphere, apparently to control the valence of the phosphor activator. Typical of such phosphors are orthophosphates which include as activator cuprous copper, or stannous tin, or mixtures thereof. Such a phosphor which comprises alkaline-earth metal plus rare-earth metal orthophosphate is disclosed in U.S. Patent No. 3,025,423, dated Mar. 13, 1962. An orthophosphate phosphor which is activated by stannous tin is disclosed in U.S. Patents No. 2,919,365, dated Dec. 29, 1959, and 3,110,680, dated Nov. 12, 1963. Orthophosphate phosphor which is activated by both cuprous copper and stannous tin is disclosed in U.S. Patent No. 3,143,510, dated Aug. 4, 1964. When such phosphors are coated onto the interior surface of a discharge lamp envelope, they are normally suspended as a paint in a vehicle such as xylol which has dissolved therein a small amount of ethyl cellulose. The phosphor paint is flushed or flowed over the surface of the envelope to be coated, the vehicle dried, and the coated envelope then lehred in air at a temperature of approximately 1,200° F. for approximately one minute, in order to decompose and volatilize the binder. Since the phosphor is initially prepared by firing the raw-mix constituents in the slightly reducing atmosphere, the lehring in air somewhat lowers the output of the phosphor as measured by that output which should reasonably be expected. It is theorized that this decrease in output is due to some oxidation of a part of the activator.

Some other phosphors which are prepared in other than an oxidizing atmosphere display a sensitivity to lehring. Examples are strontium halophosphate activated by antimony and manganese, and this phosphor is prepared by firing in nitrogen. Another such phosphor is calcium-cerium-manganese phosphate, which is prepared by firing in hydrogen. Still another example is strontium-calcium pyrophosphate activated by tin and this phosphor is prepared by firing in slightly reducing atmosphere. The performance of any of these phosphors can be improved by processing in accordance with the present invention.

It is the general object of the present invention to provide a discharge lamp which incorporates finely divided phosphor which has been intially prepared by firing in other than an oxidizing atmosphere, and which phosphor is protected during lehring and during later operation of the lamp to improve the performance of the lamp.

It is another object to provide a method for treating finely divided particles of phosphor which has been initially prepared by firing in other than an oxidizing atmosphere, in order to improve the performance of the discharge lamp which incorporates such phosphor.

It is a further object to provide a discharge lamp which incorporates alkaline-earth phosphate of generally orthophosphoric proportions, which phosphor is activated by cuprous copper, or stannous tin, or both, and which lamp has improved output.

It is an additional object to provide a method for treating a phosphor of generally orthophosphoric proportions which includes cuprous copper, or stannous tin, or both, as activator, in order to prevent a decrease in phosphor output which is normally manifested immediately after the envelope lehring operation.

The aforesaid objects of the invention, and other objects which will be apparent as the description proceeds, are achieved by providing a discharge lamp which incorporates finely divided phosphor coated on an envelope interior surface, wherein the phosphor has been initially prepared by firing in a slightly reducing atmosphere. In accordance with the invention, there is provided over the phosphor a thin, ultraviolet-transmitting layer of potassium bromide, strontium bromide, potassium chloride or sodium chloride, or any mixtures thereof. Permissible and optimum amounts are provided for each of the materials of the protective layer. In accordance with the method for protecting such lehring-sensitive phosphor, any of the foregoing materials are added in predetermined amounts as a thin layer over the phosphor. In the preferred method for applying the protective layer over the phosphor particles, the specified protective materials are dissolved in an aqueous medium which contains the phosphor in suspended form. The aqueous medium is sprayed into a gaseous atmosphere which is heated to a temperature appreciably greater than the boiling temperature of water so that the phosphor is rapidly dried with the protective material coated as a layer thereover.

For a better understanding of the invention, reference should be had to the accompanying drawings wherein:

FIGURE 1 is an elevational view, partly broken away, illustrating a fluorescent lamp which incorporates phosphor protected in accordance with the present invention; and FIG. 2 is an elevational view, partly broken away, illustrating a high-pressure, mercury-vapor lamp which incorporates a phosphor protected in accordance with the present invention.

With specific reference to the form of the invention illustrated in the drawings, the numeral 10 in FIG. 1 indicates a fluorescent lamp comprising a tubular, vitreous envelope 12 coated internally with phosphor 14 which has been treated in accordance with the present invention. Sealed at each end of the envelope 12 are mounts, each comprising an electrode 16, reentrant stem press 18, and lead-in conductors 20. Base caps 22 and base pins 24 are provided at the envelope ends. Except for the protected phosphor 14, the construction of the lamp 10 is conventional.

In FIG. 2 is shown a high-pressure, mercury-vapor lamp 26, which comprises a radiation-transmitting outer envelope 28 having a conventional screw-type base 30 connected thereto. In accordance with the present invention, the protected phosphor is included as a layer 32 on the inner surface of the outer envelope 28. An arc tube 34 is supported within the outer envelope 28 by means of a conventional supporting frame 36. A starting resistor 38 connects a starting electrode 40 to one side of the energizing potential and, during operation, the mercury arc is sustained within the arc tube 34 between operating electrodes 42. With the exception of the treated, protected phosphor 32, the lamp 26 is conventional.

In the preferred method for treating the phosphor in accordance with the present invention, the prepared, finely divided phosphor is first suspended in an aqueous medium which has dissolved therein one or more of potassium bromide, strontium bromide, potassium chloride or sodium chloride. This protective material can be dissolved in the aqueous medium either before or after the phosphor is suspended therein. In the case of strontium bromide, this material is included in the aqueous medium in amount of from 0.03% to 0.75% by weight of the phosphor suspended therein. The other additives, namely potassium bromide, potassium chloride or sodium chloride are dissolved in the aqueous medium in amount of from 0.01% to 0.4% by weight of the phosphor. In the case of mixtures of the foregoing materials, the total amount of additive used can be up to 0.75% by weight of the phosphor.

The aqueous medium, dissolved additive material and suspended phosphor are then sprayed into a gaseous medium which is heated to a temperature appreciably greater than the boiling temperature of water, such as a temperature of 315° C., for example. This dries the phosphor very rapidly with the additive material coated thereover as a thin layer. Such a drying procedure is disclosed in U.S. Patent No. 3,023,339, dated Feb. 27, 1962.

To coat the foregoing phosphor, 150 kgs. are suspended in 200 liters of a liquid vehicle such as xylol which has a small amount of organic binder added thereto in order to control the viscosity of the resulting paint. As an example, three percent by weight of ethyl cellulose binder is included in the paint. Other known binders can be substituted for the ethyl cellulose. The paint is then flushed or flowed over the interior surface of the discharge lamp bulb, the vehicle evaporated and the bulb then lehred at a temperature of approximately 1200° F. for about one minute, in order to decompose and volatilize the binder, leaving the phosphor adhered to the inner surface of the bulb.

The optimum amount of potassium bromide, potassium chloride or sodium chloride which can be used is about 0.1% by weight of the phosphor which is coated. In the case of strontium bromide, the optimum amount varies from 0.1% to 0.5% by weight of the phosphor. The preferred protective material is potassium bromide.

The resulting protected phosphor can be used in conjunction with either low-pressure discharge lamps, such as the fluorescent lamp 10, or high-pressure discharge lamps, such as the high-pressure mercury vapor lamp 26. The phosphor can be used as a single coating constituent, or it can be used as a part of a phosphor blend. As a specific example of a blend, 41.4% by weight of strontium-magnesium-calcium orthophosphate, activated by 0.85% by weight of stannous tin, is blended with 42% by weight of blue-white halophosphate, 14.9% of a blue halophosphate and 1.7% of zinc silicate activated by manganese, which constitutes a deluxe blend of phosphor materials for a fluorescent lamp. Prior to blending, the orthophosphate phosphor was treated with 0.1% by weight of potassium bromide in accordance with the present invention. In a 40 watt lamp, the resulting blend displayed a 100-hour output which was 64 lumens greater than the control lamp incorporating identical phosphors which had not been treated. When the foregoing orthophosphate phosphor was incorporated into the fluorescent lamp as a single constituent, the lamp had a 100-hour output approximately 11% greater than the otherwise identical lamp which incorporated the control, or untreated phosphor. This increase in output over the control is maintained throughout prolonged life testing; apparently the protective coatings of the present invention serve a beneficial effect in protecting the sensitive phosphor during operation of the lamps, as well as during envelope lehring.

As noted hereinbefore, the present treatment will improve any phosphor which is sensitive to lehring and which is initially prepared by firing in other than an oxidizing atmosphere. A lamp incorporating a strontium-aluminum otrhophosphate activated by cuprous copper displayed a 100-hour lumen increase of 34.9% over the control when the phosphor was treated in accordance with the present invention. As the general rule, the treated phosphor will be of generally orthophosphoric proportions and include at least one of cuprous copper and stannous tin as activator, since these phosphors are particularly sensitive. This includes a broad class of phosphors which principally comprise alkaline-earth orthophosphates, as described in the foregoing patents.

The preferred method for applying the protective layer over the phosphor involves suspending the phosphor in an aqueous medium which contains the dissolved protective material, and thereafter spraying the suspension into a heated chamber to coat the phosphor. Other methods can be used to coat the particles of the phosphor with the thin layer of the indicated protective materials. As an alternative method for applying these protective materials, any of the materials can be added, in the amounts as specified, directly to the phosphor paint, such as described hereinbefore. The protective material is then deposited on the envelope with the phosphor and apparently will coat over the finely divided phosphor during the lehring operation. It is preferred, however, to apply the protective materials over the phosphor in accordance with the spray-drying technique as described hereinbefore.

It will be recognized that the objects of the invention have been achieved by providing a discharge device which incorporates phosphor which is normally sensitive to lehring, and which phosphor has been treated in order to improve the output of the discharge device. There has also been provided a method for treating the phosphor to eliminate its sensitivity to lehring and improve the output of the device which incorporates such phosphor.

While preferred examples have been illustrated and described hereinbefore, it is particularly understood that the invention is not limited thereto annd thereby.

I claim as my invention:

1. In combination with a discharge lamp incorporating finely divided phosphor coated on an envelope interior surface, said phosphor having been initially prepared by firing in other than an oxidizing atmosphere, the improvement which comprises: a thin ultraviolet-transmitting layer of potassium bromide or strontium bromide or potassium chloride or sodium chloride or any mixtures thereof carried on said phosphor particles, said strontium bromide present in amount of from 0.03% to 0.75% by weight of said phosphor, said potassium bromide or potassium chloride or sodium chloride present in amount of from 0.01% to 0.4% by weight of said phosphor, and said mixtures present in amount of up to 0.75% by weight of said phosphor.

2. The discharge lamp as specified in claim 1, wherein said phosphor is of generally orthophosphoric proportions and includes at least one of cuprous copper and stannous tin as activator.

3. The discharge lamp as specified in claim 2, wherein said phosphor principally comprises alkaline-earth orthophosphate and includes at least one of cuprous copper and stannous tin as activator.

4. The discharge lamp as specified in claim 3, wherein said phosphor is strontium-magnesium-calcium orthophosphate activated by stannous tin.

5. The discharge lamp as specified in claim 3, wherein said potassium bromide or potassium chloride or sodium chloride is present in amount of about 0.1% by weight of said phosphor, and said strontium bromide is present in amount of from 0.1% to 0.5% by weight of said phosphor.

6. The method of treating finely divided particles of phosphor which has been initially prepared by firing in a slightly reducing atmosphere, in order to improve the performance of a discharge lamp which incorporates such phosphor, which method comprises: applying over the particles of said phosphor a thin layer of potassium bromide or strontium bromide or potassium chloride or sodium chloride or any mixtures thereof, said strontium bromide applied in amount of from 0.03% to 0.75% by weight of said phosphor, said potassium bromide or potassium chloride or sodium chloride applied in amount of from 0.01% to 0.4% by weight of said phosphor, and said mixtures applied in amount of up to 0.75% by weight of said phosphor.

7. The method as specified in claim 6, wherein said phosphor is of generally orthophosphoric proportions and includes at least one of cuprous copper and stannous tin as activator.

8. The method as specified in claim 7 wherein said phosphor principally comprises alkaline-earth phosphate of generally orthophosphoric proportions and includes at least one of cuprous copper and stannous tin as activator.

9. The method as specified in claim 8, wherein said thin layer is applied over said finely divided phosphor particles by the steps comprising:

(a) suspending said finely divided phosphor in an aqueous medium and dissolving in said aqueous medium an additive material of strontium bromide or potassium bromide or potassium chloride or sodium chloride or any mixtures thereof, said strontium bromide present in amount of from 0.03% to 0.75% by weight of said phosphor, said potassium bromide or potassium chloride or sodium chloride present in amount of from 0.01% to 0.4% by weight of said phosphor, and said mixtures present in amount of up to 0.75% by weight of said phosphor;

(b) spraying said aqueous medium and suspended phosphor into a gaseous medium which is heated to a temperature appreciably greater than the boiling temperature of water to dry said finely divided phosphor with said additive material coated as a layer thereover; and (c) separating said coated phosphor from said gaseous medium.

10. The method as specified in claim 9, wherein potassium bromide or potassium chloride or sodium chloride is dissolved in said aqueous medium in amount of about 0.1% by weight of said phosphor, and said strontium bromide is dissolved in said aqueous medium in amount of from about 0.1% to 0.5% by weight of said phosphor.

11. The method as specified in claim 8, wherein said layer is applied to the particles of said phosphor by first preparing a coating paint which includes an organic binder and a liquid vehicle for applying said phosphor to the inner surface of a discharge lamp envelope, and said paint includes as a constituent thereof an additive material of potassium bromide or strontium bromide or potassium chloride or sodium chloride or any mixtures thereof, said potassium bromide or potassium chloride or sodium chloride included in said paint in amount of from 0.01% to 0.4% by weight of said phosphor in said paint, said strontium bromide included in said paint in amount of from 0.03% to 0.75% by weight of said phosphor in said paint, and said mixtures included in said paint in amount of up to 0.75% by weight of said phosphor in said paint; applying said paint to the inner surface of said envelope; evaporating said liquid vehicle from said paint; and lehring said dried paint to decompose and volatilize said organic binder from the residual phosphor and additive material.

References Cited

UNITED STATES PATENTS

| | | | |
|---|---|---|---|
| 3,023,339 | 2/1962 | Vodoklys | 313—109 |
| 3,110,680 | 11/1963 | Koelmans et al. | 252—301.4 X |
| 3,328,620 | 6/1967 | Rimbach | 313—109 |
| 3,348,961 | 10/1967 | Ropp et al. | 117—33.5 |

JAMES W. LAWRENCE, *Primary Examiner.*

R. F. HOSSFELD, *Assistant Examiner.*

U.S. Cl. X.R.

117—33.5, 100; 252—301.4